US009403649B2

(12) United States Patent  (10) Patent No.: US 9,403,649 B2
Garrow et al.  (45) Date of Patent: *Aug. 2, 2016

(54) LOADING DOCK BUMPER ASSEMBLY

(71) Applicant: DL Manufacturing, North Syracuse, NY (US)

(72) Inventors: Kristian P. Garrow, Cortland, NY (US); Donald L. Metz, Kirkville, NY (US); David Martini, Liverpool, NY (US)

(73) Assignee: DL Manufacturing, North Syracuse, NY (US)

( * ) Notice: Subject to any disclaimer, the term of this patent is extended or adjusted under 35 U.S.C. 154(b) by 51 days.

This patent is subject to a terminal disclaimer.

(21) Appl. No.: 14/205,753

(22) Filed: Mar. 12, 2014

(65) Prior Publication Data

US 2014/0265071 A1  Sep. 18, 2014

Related U.S. Application Data

(60) Provisional application No. 61/778,216, filed on Mar. 12, 2013.

(51) Int. Cl.
  *B65G 69/00*  (2006.01)
(52) U.S. Cl.
  CPC ................................ *B65G 69/001* (2013.01)
(58) Field of Classification Search
  CPC ...... B65G 69/001; B65G 69/008; E02B 3/26; F16F 1/422; F16F 2236/02
  USPC ................... 267/139, 140; 114/219
  See application file for complete search history.

(56) References Cited

U.S. PATENT DOCUMENTS

| | | | | |
|---|---|---|---|---|
| 3,828,715 A * | 8/1974 | Matsushita | ............. | 114/219 |
| 3,841,683 A * | 10/1974 | Toro | ...................... | 293/107 |
| 4,854,258 A * | 8/1989 | Hausmann et al. | ........... | 114/219 |
| 4,856,626 A * | 8/1989 | Nakanishi | ................. | 188/371 |
| 4,929,008 A * | 5/1990 | Esfandiary | ................. | 293/108 |
| 6,120,871 A * | 9/2000 | De Biase | ...................... | 428/68 |
| 6,209,857 B1 * | 4/2001 | Berends | ................... | 267/140 |
| 2005/0102929 A1 * | 5/2005 | Hoffmann et al. | ........... | 52/173.2 |
| 2007/0151819 A1 * | 7/2007 | Schmidt et al. | .............. | 188/377 |
| 2007/0152390 A1 * | 7/2007 | DiBiase | ..................... | 267/140 |
| 2014/0312541 A1 * | 10/2014 | Metz | ............................ | 267/139 |

\* cited by examiner

*Primary Examiner* — Xuan Lan Nguyen
(74) *Attorney, Agent, or Firm* — Harris Beach PLLC (57) ABSTRACT

A loading dock bumper assembly for securement to a loading dock wall includes a dock bumper and a mounting provision coupled to the bumper. The dock bumper includes a mounting portion, an impact-absorbing portion opposing the mounting portion, and a deformable spanning portion joining the mounting portion and the impact-absorbing portion. The mounting portion is adapted for coplanar alignment with the loading dock wall, the impact-absorbing portion is adapted for direct contact with a rear frame of a vehicle, and the bumper defines an internal cavity that is filled with a fluid. A mounting provision is coupled to the bumper. The mounting provision is adapted for installation to the loading dock wall. The loading dock bumper assembly further includes a hard stop adapted to retard further deformation of the spanning portion. The hard stop includes a two-piece outer shell to capture and retain a resilient, deformable inner member.

16 Claims, 10 Drawing Sheets

LOADING DOCK BUMPER ASSEMBLY

CROSS REFERENCE TO RELATED APPLICATION

Reference is made to and this application claims priority from and the benefit of U.S. Provisional Application Ser. No. 61/778,216, filed Mar. 12, 2013, entitled "LOADING DOCK BUMPER ASSEMBLY", which application is incorporated herein in its entirety by reference.

FIELD OF THE INVENTION

This disclosure relates generally to loading docks and, more specifically, to a resilient bumper used for protecting loading docks and other structures subject to damaging impacts of a vehicle.

BACKGROUND OF THE INVENTION

Conventional loading docks include an overhead door frame, a dock platform or floor, a recess or pit in the floor, and a dock leveler assembly within the pit to compensate for height differences between a dock platform and the bed of a parked vehicle such as a tractor trailer truck. A dock bumper is typically positioned against the outside dock wall to either side of the pit, extending longitudinally away from the dock floor approximately 4 to 6 inches. The bumpers are engaged by the rear frame or bumper of the vehicle when the vehicle is backed into a parked position relative to the dock leveler assembly. The bumpers prevent the vehicle from striking and damaging the dock wall and the various components of the dock leveler assembly.

Conventional dock bumpers are fabricated from strips of used rubber tires. Others are formed from wood. In one typical construction, the rubber tire strips are cut into sections approximately 24 inches by 6 inches and stacked to a thickness of approximately 18 inches. The stack is sandwiched between steel plates and the plates are bolted so as to compress the strips, thereby forming a bumper assembly. The bumper assembly is oriented so the strips are vertical; 24 inches tall and jutting from the dock wall approximately 6 inches. The steel plates, which usually include an L-bracket, compress the bumper assembly and are then secured to the dock wall using the bracket.

Although a bumper assembly formed from rubber strips or wood can be useful and may be advantageous for certain applications, it suffers from drawbacks. One drawback is that shock loads from the vehicle hitting the bumpers are transferred directly into the dock wall. The steel plates that compress the bumper assembly are secured to the dock wall, typically by several bolts. The stack of rubber strips is adapted to contact the dock wall, when compressed. However, the rubber strips do not completely contact the dock wall and may contact in an uneven manner. In addition, due to the spring rate characteristics of the rubber material, the rubber undergoes only a limited amount of compression, after which higher loads transfer directly to the dock wall. In the case when a trailer hits the bumper hard, the rubber strips absorb a relatively small portion of the load and the remainder is transferred to the dock wall as a shock load. Over time, the repeated shock loads can cause the dock wall to deteriorate, since the wall was not specifically designed to absorb the concentrated point loads.

SUMMARY OF THE INVENTION

In accordance with one aspect of the disclosure, provided is a loading dock bumper assembly for securement to a loading dock wall. The loading dock bumper assembly includes a dock bumper and a mounting provision coupled to the bumper. The dock bumper includes a mounting portion, an impact-absorbing portion opposing the mounting portion, and a deformable spanning portion joining the mounting portion and the impact-absorbing portion. The mounting portion is adapted for coplanar alignment with the loading dock wall, the impact-absorbing portion is adapted for direct contact with a rear frame of a vehicle, and the bumper defines an internal cavity filled with a fluid. A mounting provision is coupled to the bumper. The mounting provision is adapted for installation to the loading dock wall. The loading dock bumper assembly further includes a hard stop adapted to retard further deformation of the spanning portion. The hard stop includes a two-piece outer shell to capture and retain a resilient, deformable inner member.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 1:
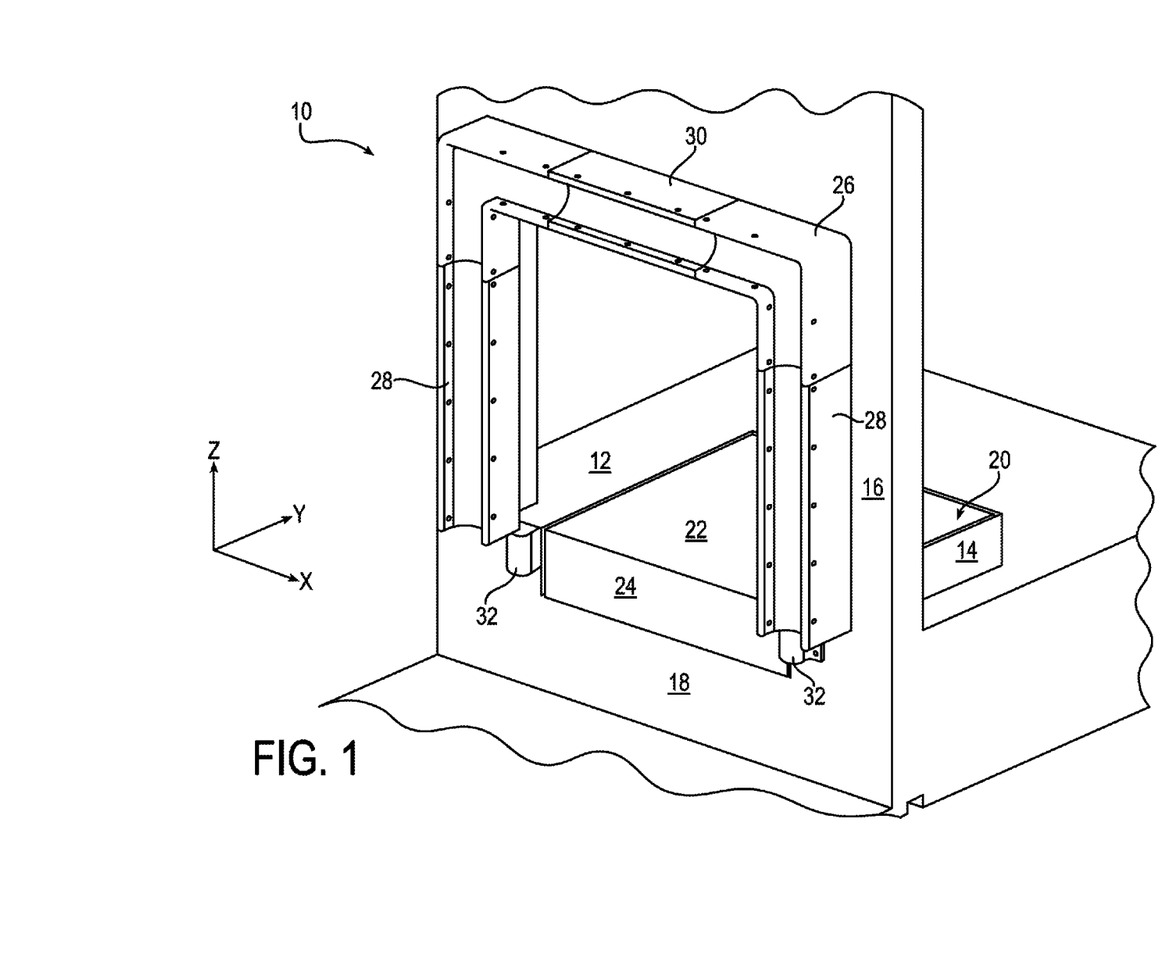
FIG. 1 depicts a top perspective view, from outside a building, of a loading dock with bumper according to one embodiment of the invention.

Referring to FIG. 1, a top perspective view of a loading dock 10 is illustrated. The loading dock 10 includes a loading surface or floor 12 and a recess or pit 14 (shown in dashed lines). The floor 12 extends longitudinally in the loading dock door frame 16 to a loading dock wall 18 which is typically the outside wall of the building.

For purposes of illustration and to further explain orientation of certain features of the invention, a lateral axis is defined as substantially parallel to the loading dock wall and is denoted as the x-axis; a longitudinal axis is defined as substantially in the direction of vehicle motion when backing into the loading dock and is denoted as the y-axis; and the vertical axis is denoted as the z-axis.

A dock leveler assembly 20 mounted within the pit 14 compensates for the vertical height difference between the floor 12 and the bed of a parked vehicle and to span the longitudinal distance which frequently occurs between the loading dock floor 12 and the bed of the vehicle. The dock leveler assembly 20 includes a frame (not shown) mounted to the pit floor. A ramp or deck 22 is pivotally connected to the frame at the rear of the pit 14 so that the deck 22 can pivot between lowered, level and raised positions. An extension plate or lip 24 (shown in the retracted position) is pivotally connected to a front face of the frame or deck. The deck 22 is typically rectangular in shape and covers the open top of the pit 14 and is adapted to be approximately flush with the dock floor 12 when the deck is not in use. The deck 22 may be actuated upwards and downwards by a spring-loaded lifting system, a hydraulic lifting system, or other conventional means.

The loading dock 10 may further include a dock seal structure 26 surrounding the door frame 16, adapted to seal a vehicle cargo area to the loading dock. The dock seal 26 includes vertical side members 28 along both sides of the loading bay door, and a horizontal header/corner 30 extending across the top of the door. Further description of the dock seal 26 is provided in commonly owned U.S. patent application Ser. No. 61/522,007 entitled "SEALING DEVICE FOR USE WITH LOADING DOCK" filed on Aug. 10, 2011, which is hereby incorporated herein by reference in its entirety.

The loading dock 10 further includes a loading dock bumper 32 positioned against the dock wall 18 to either side of the pit 14, extending longitudinally away from the dock floor 12 approximately 4 to 6 inches. The bumper 32 is engaged by the rear frame or bumper of the vehicle when the vehicle is backed into a parked position relative to the dock leveler assembly 20, and provides a stop for the vehicle (e.g., the vehicle can move no closer to the dock). The bumpers 32 further prevent the vehicle from striking and damaging the dock wall 18 and the various components of the dock leveler assembly 20.

In operation, a vehicle backing into the loading dock 10 first engages the dock seal 26. The dock seal 26 deforms to provide an effective seal around the sides and top of the trailer. The trailer then engages the bumper 32 and the vehicle is parked. When the dock leveler assembly 20 is being adjusted to accommodate the bed of the parked vehicle, the deck 22 is normally pivoted upwardly so that the lip 24 will clear the rear end of the parked vehicle before it is pivoted outwardly to an extended position. Once the lip 24 has assumed its extended position, the deck 22 and lip are lowered as a unit until the lip rests upon the top surface inside the vehicle bed. The lip 24 allows a forklift truck and dock personnel to readily move between the deck 22 and the vehicle bed. The lip 24 spans the lateral distance between the bumpers 32 and is preferably formed of steel plate and thus capable of withstanding substantial loads. When the loading dock 10 is not in use, the deck 22 normally assumes a horizontal position wherein the exposed top surface of the deck is substantially coplanar with the loading dock floor 12.

Figure 2:
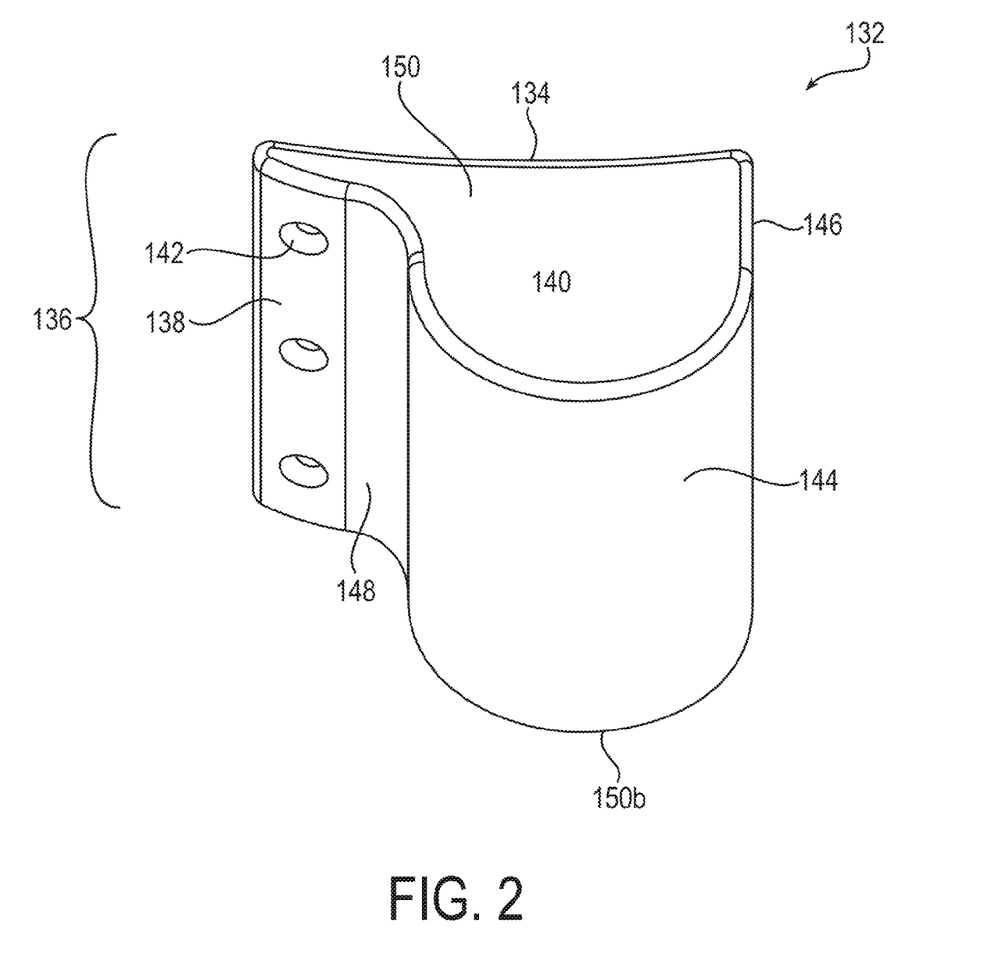
FIG. 2 depicts a top perspective view of the loading dock bumper of FIG. 1, shown in the free state.

Referring to FIG. 2, a top perspective view of a loading dock bumper 132 is shown according to one embodiment of the invention. The bumper 132 includes a mounting portion 134 and a mounting provision 136 adapted for installation to the loading dock wall. In the disclosed embodiment, the mounting provision 136 includes a flange 138 extending from one side of the body 140 of the bumper 132. The flange 138 includes at least one aperture 142 through which fasteners (such as mounting bolts or the like, not shown) may be passed to secure the bumper to the dock wall. The mounting flange 138 is preferably located opposite the side next to the loading dock pit, so the bumper may be placed as close as possible to the pit. In some embodiments (not illustrated), the mounting flange may be located on the top or bottom of the main body.

The dock bumper 132 further includes an impact-absorbing portion 144 in opposing relation to the mounting portion 134. The impact-absorbing portion 144 is adapted for direct contact with the rear frame or bumper of the vehicle. In the disclosed embodiment, the impact-absorbing portion 144 is convex to better distribute the trailer loads, but other shapes, including flat, are contemplated within the scope of the invention.

The dock bumper 132 further includes a deformable spanning portion 146 joining the mounting portion 134 and the impact-absorbing portion 144. The spanning portion 246 of the bumper body is designed to deform under the loads imparted by the truck bumper. In some embodiments, the bumper 132 includes a second spanning portion 148, which may be deformable, also joining the mounting portion 134 and the impact-absorbing portion 144, thereby forming a closed structure or enclosure. The transverse ends 150a, 168b of the body 140 may be open or closed. In the illustrated embodiment, the transverse ends 168 are closed to form an enclosure.

In one embodiment of the invention, the mounting portion 134 may have a contour in a free state that is different from the planar contour of the loading dock wall. However, the mounting portion 134 may be adapted to substantially deform to that of the loading dock wall in the constrained state. In one example, shown in the FIGS. 2-3, the mounting portion 134 in the free state defines a concave arc. When fasteners bolt the flange 138 to the dock wall, the mounting portion 134 is constrained to flatten out and substantially match the planar surface of the dock wall. In this manner, the mounting portion 134 maximizes contact area with the dock wall prior to the vehicle making contact with the impact-absorbing portion 144. A mounting portion that, in the free state, matches the dock wall may be susceptible to deformation upon loading, which would decrease the contact surface area.

Figure 3:
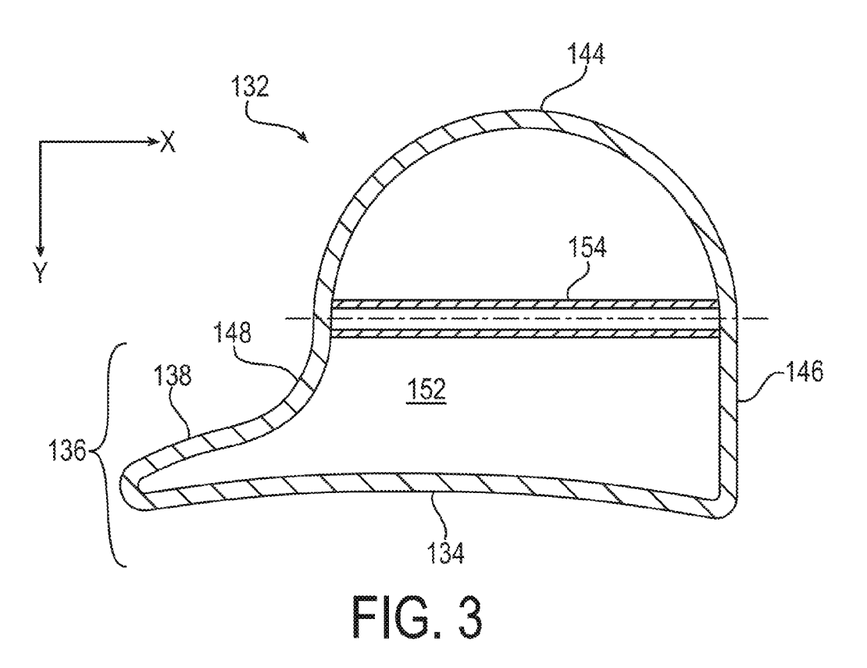
FIG. 3 depicts a side cross sectional view of the loading dock bumper shown in FIG. 2.

Referring now to FIG. 3, a side elevation cross sectional view of the loading dock bumper 132 is shown. The bumper 132 may be formed of a material that is soft and pliable to allow deformation under load that advantageously aides in decreasing the point loads on the dock wall. In this regard, the bumper 132 may be formed of a thermoplastic polymer. In one embodiment, the thermoplastic polymer may be molded to form a closed skin, forming an internal cavity 150 thereby that may include a fluid. The term fluid is intended to be interpreted broadly so as to include compressible and incompressible fluids such as liquids, gases, or mixtures of both. For example, the fluid may be water, glycol, air, nitrogen, or a gel. In one preferred embodiment, the fluid is a compressible gas such as air.

In a further example, the bumper 132 may be formed of a thermoplastic polymer that is homogeneous. By homogeneous, it is meant that the bumper 132 is formed of a single material. In some embodiments, the bumper 132 comprises a homogeneous thermoplastic polymer that forms a closed skin, thereby creating the internal cavity 150. The bumper 132 may be formed by a rotational molding process (e.g., rotomolding or spin casting), in which a hollow mold is first created that defines the outer contours of the bumper 132. A measured quantity of the thermoplastic polymer is placed in the mold, and the mold is then heated and rotated about multiple axes. As the temperature of the hollow mold increases, the thermoplastic material softens and adheres to the inner walls of the mold. The mold continues to rotate at all times during the heating phase in order to maintain an even thickness and to avoid sagging or deformation during the cooling phase. After cooling, the finished bumper 132 is removed from the mold. The inventor has determined that a candidate material for the disclosed bumper 132 is flexible polyvinylchloride having a thickness in the range of 0.08 to 0.25 inches (0.20 to 0.64 cm). Other candidate materials include low density polyethylene, and some high density polyethylenes including cross-linked polyethylene. A further candidate material is vinyl-impregnated nylon.

In some embodiments, the bumper 132 may be formed of a material that provides superior resistance to abrasion so the impact-absorbing portion 144 can withstand the rubbing with the rear cargo frame of the vehicle. In one example, the bumper 132 is formed of an abrasion-resistant material. The abrasion resistance of the material, or resistance to wear, may be measured by a standardized test method such as Taber abrasion test ASTM D4060, which measures a plastic's weight loss when subjected to a weighted abrasion wheel. In one example, the weight loss of the material when subjected to ASTM D4060 testing is less than 5%. In another example, the weight loss of the material is less than 1%. In yet another example, the weight loss of the material is less than 0.5%. An exemplary material meeting an acceptable abrasion resistance value is the aforementioned flexible polyvinylchloride. Initial testing using flexible PVC material demonstrated superior resistance to the abrasive loads imparted to the seal structure by the trailer frame.

The bumper 132 may include one or more strengthening members 152 to permit directional deformation of the bumper. Directional deformation allows the bumper 132 to compress or deflect in one axis while resisting compression or deflection in another axis. In one embodiment, the strengthening member 152 is a hollow cylindrical plastic tube 154 formed into an eyelet passing through the bumper 132. In the illustrated embodiment, the strengthening members 152 would restrict deflection of the bumper 132 in the lateral x-axis, yet permit deflection in the longitudinal y-axis and, to a lesser degree, the vertical z-axis. Although not illustrated in the accompanying drawings, the strengthening members 152 could also include raised ribs formed on the skin or surface of the bumper 132. The ribs could be aligned in such a manner so as to allow deformation in one axis while limiting deformation in another axis.

In some embodiments, the strengthening members 152 may be formed of foam, and may comprise a shaped solid block rather than the illustrated tubes. In some embodiments including a flexible polyvinylchloride forming a closed skin and internal cavity 150, the foam 152 may be inserted after the bumper 132 is slit open into two halves, and the slit may be resealed with epoxy, for example.

Figure 4:
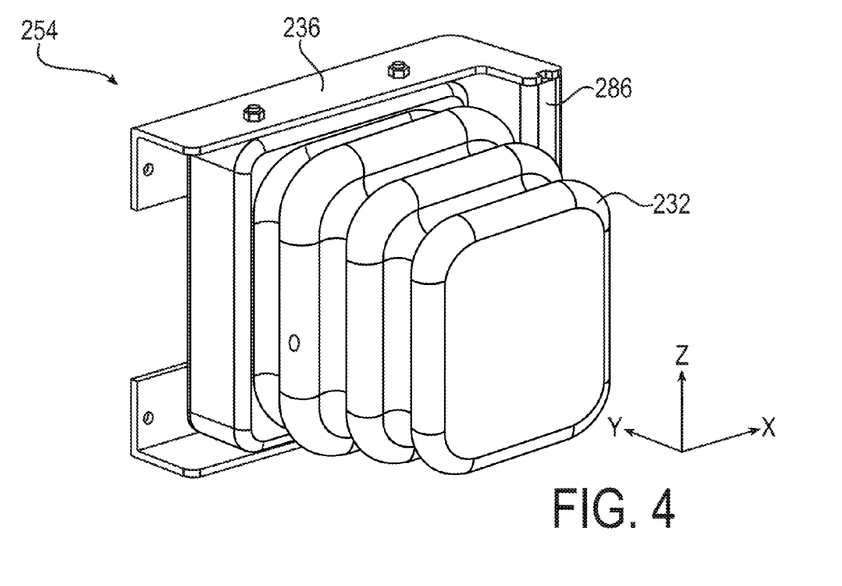
FIG. 4 depicts a top perspective view of a loading dock bumper assembly according to an embodiment of the invention.

Turning now to FIG. 4, wherein like numbers indicate like elements from FIGS. 2 and 3, a perspective view of a loading dock bumper assembly 254 is shown according to one embodiment of the invention. The assembly 254 includes a loading dock bumper 232 coupled to a mounting provision 236 adapted for installation to the loading dock wall 18 (FIG. 1).

Figure 5:
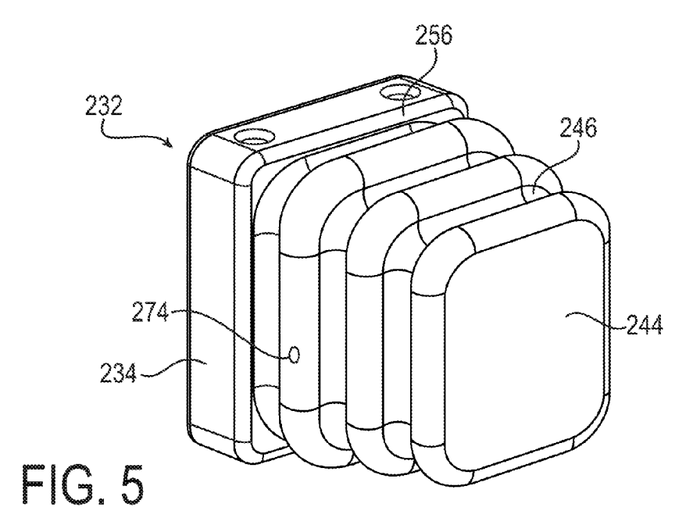
FIG. 5 depicts a top perspective view of the dock bumper illustrated in FIG. 4.
Figure 6:
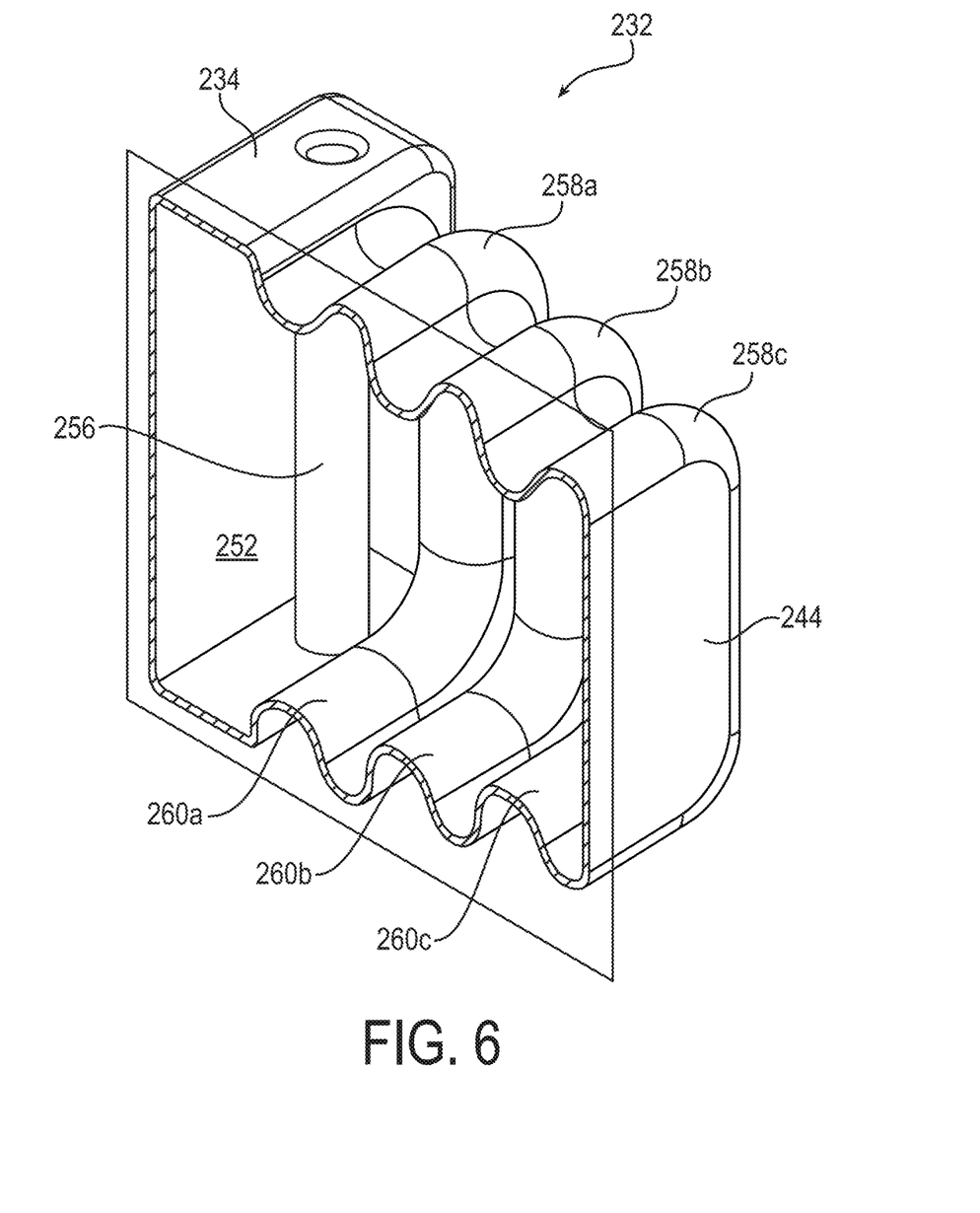
FIG. 6 depicts a top perspective view, in cross section, of the dock bumper illustrated in FIG. 5.
Figure 7:
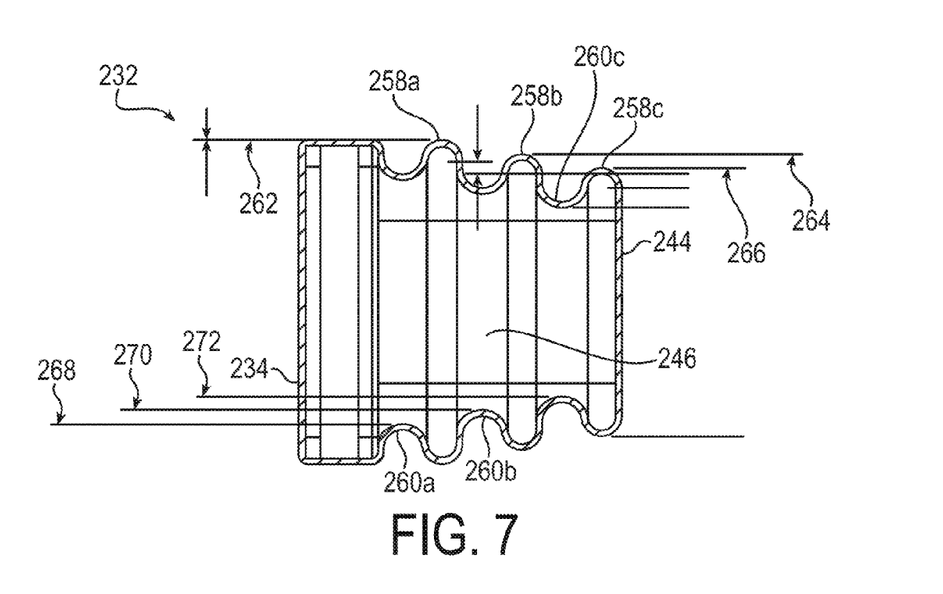
FIG. 7 depicts a side view, in cross section, of the dock bumper illustrated in FIG. 5.

The bumper 232, shown in isolation in FIG. 5 and in cross section in FIG. 6, includes a mounting portion 234 adapted for coplanar alignment with the loading dock wall. In the disclosed embodiment, the mounting portion 234 is essentially flat, and is adapted to fit against the mounting provision 236, which may be welded, fastened, or otherwise affixed to the dock wall. The mounting portion 234 of bumper 232 may further include at least one passage 256 through which a fastener is passed. In the disclosed embodiment, the passage 256 comprises an internal tube.

The bumper 232 further includes an impact-absorbing portion 244 in opposing relation to the mounting portion 234. The impact-absorbing portion 244 is adapted for direct contact with the rear frame or bumper of the vehicle. In the disclosed embodiment, the impact-absorbing portion 244 is a flat surface to better capture the wide variety of possible trailer bumper configurations and promote even distribution of the bumper loading.

The bumper 232 further includes a deformable spanning portion 246 joining the mounting portion 234 and the impact-absorbing portion 244. The spanning portion 246 deforms under load, e.g., when the vehicle bumper is pushing against the impact-absorbing portion 244 of the body 240, and provides a resistance to counter the force. Depending upon the particular geometry of the spanning portion 246, the resistance force can be linear or non-linear with the longitudinal deformation. Unlike prior art dock bumpers utilizing a helical spring or strips of rubber that transfer the spring force directly to the dock wall, the force on the impact-absorbing portion 244 is absorbed in large part by the deformation of the spanning portion 246 and thus imparts a smaller portion of the load to the dock wall.

In one embodiment, the dock bumper 232 defines a variable-volume enclosure. An internal cavity 250 contains a compressible fluid, in one example air. As the vehicle bumper pushes against the impact-absorbing portion 244, the spanning portion 246 deforms, thereby decreasing the volume of the internal cavity 250, and compressing the air. The spanning portion 246 may be formed of a material that is pliable and stretches with the increased pressure. The pressure in the internal cavity 250 exerts a uniform force on the internal surfaces of the spanning portion 246, the impact-absorbing portion 244, and the mounting portion 234. Because the mounting portion 234 is the only portion in contact with the dock wall, the resultant force on the wall is much less than a conventional spring or rubber block.

In one example, illustrated in FIGS. 4-7 and 9, the deformable spanning portion 246 defines a bellows, characterized by successively joined major and minor diaphragms 258 and 260, respectively. In the disclosed embodiment, the bellows portion 246 is characterized by three successively joined major and minor diaphragms 258a-258c and 260a-260c, respectively. The outer radial dimension 262 of the first major diaphragm 258a is greater than the outer radial dimension 264 of the second major diaphragm 258b, and the outer radial dimension 264 of the second major diaphragm 258b is greater than the outer radial dimension 266 of the third major diaphragm 258c. Similarly, the inner radial dimension 268 of the first minor diaphragm 260a is greater than the inner radial dimension 270 of the second minor diaphragm 260b, and the inner radial dimension 270 of the second minor diaphragm 260b is greater than the third inner radial dimension 272 of the third minor diaphragm 260c. In this manner, the first major diaphragm 258a is positioned closer to the mounting portion 234 than the second major diaphragm 258b. This construction has been found to provide more reliable deformation under transverse loads.

Returning to FIGS. 4 and 5, in one embodiment a pressure relief port 274 vents the fluid within the internal cavity 250 to prevent over-pressurization, such as during a shock load to the impact-absorbing portion 244. Over-pressurization could cause structural failure of the bumper, akin to an explosion, and the rapidly escaping fluid could be dangerous to nearby loading dock personnel. The pressure relief port 256 may also be adapted to better control the degree of resistance provided to the vehicle bumper. For example, the pressure relief port 256 may provide a smoother (or slower) deformation of the spanning portion 246, thus minimizing or eliminating the "bounce-back" phenomenon when the truck literally bounces off the impact-absorbing portion 244. In one example, the pressure relief port 256 is a ¼-inch diameter orifice in a non-contact surface of the bumper, such as the spanning portion 246.

Figure 8:
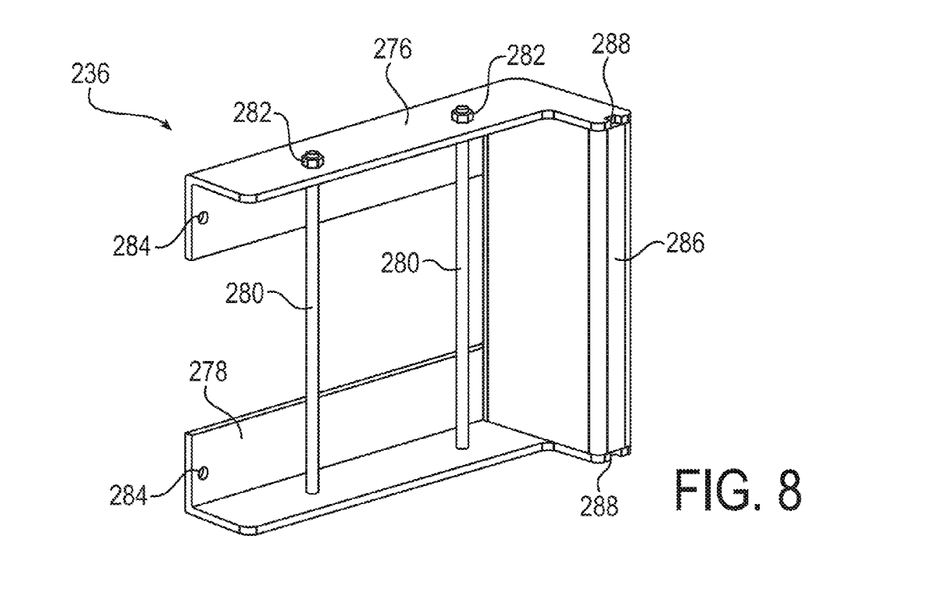
FIG. 8 depicts a top perspective view of the mounting provision illustrated in FIG. 4.

Turning to FIG. 8, the mounting provision 236 of the loading dock bumper assembly 200 is shown for clarity with the bumper 232 removed. The mounting provision 236 includes a support structure for the bumper 232 as well as a means to secure the assembly 200 to the loading dock wall. In one example, top and bottom L-brackets 276 and 278, respectively, capture the bumper 232. Fasteners such as tie rods 280 are inserted through the passage 256 in the bumper 232 (FIG. 6), and nuts 282 securely clamp the brackets 276, 278 and bumper 232 together. In a typical installation, the brackets 276, 278 are formed of cold rolled steel, and welded to a steel plate on the loading dock wall. In an alternate or addition installation, the assembly 200 can be bolted to the dock wall using the bolt holes 284 provided in the brackets 276, 278.

The mounting provision 236 may further include a hard stop 286 adapted to retard further deformation of the spanning portion 246. As best appreciated with reference to FIG. 4, a vehicle bumper (not shown) will deform the loading dock bumper 232 in the longitudinal direction (e.g., along y-axis) until the vehicle bumper engages the hard stop 286. The hard stop 286 may be formed of metal, or may be formed of a resiliently stiff material such as hard rubber, engineered plastic, polyethylene, or the like. In one embodiment, the characteristic spring rate of the hard stop 286 is more than ten times the characteristic spring rate of the dock bumper 232. In other embodiments, the hard stop 286 may provide more of a stiffer secondary cushion rather than an abrupt stoppage. In this manner, the characteristic spring rate of the hard stop 286 can be approximately two to five times greater than the characteristic spring rate of the dock bumper 232.

Figure 9:
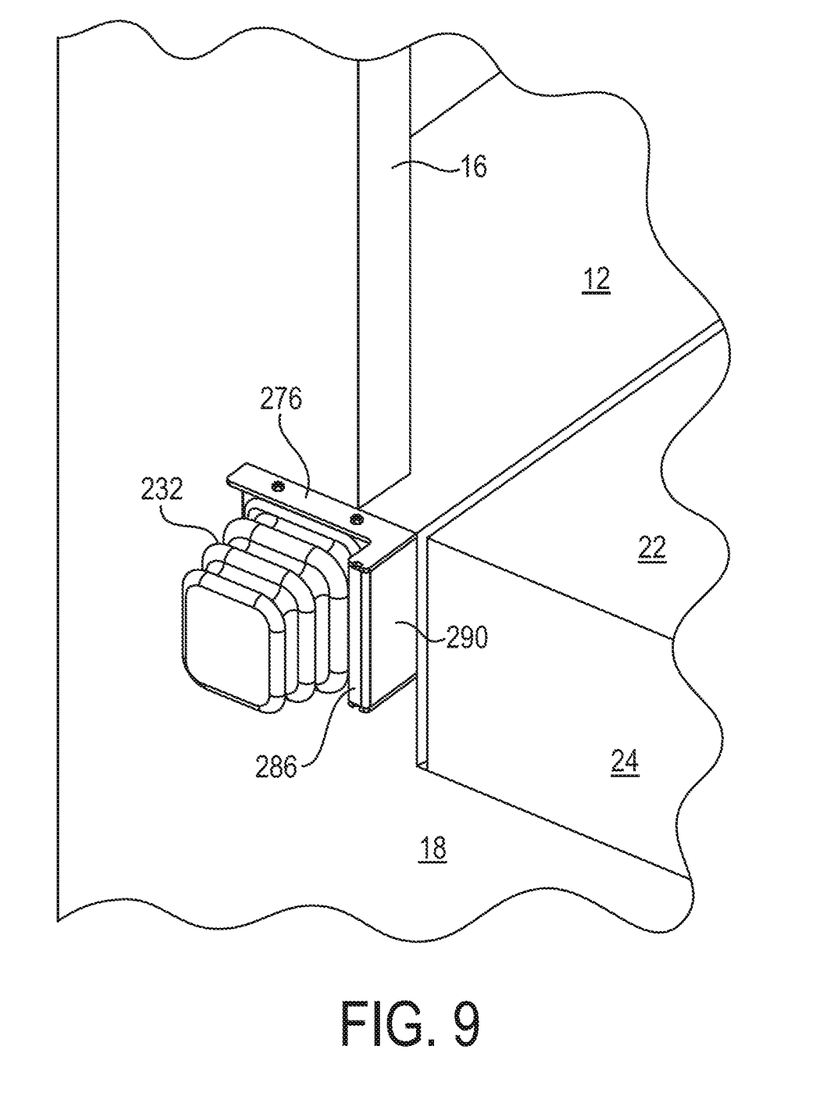
FIG. 9 depicts a top perspective view of the loading dock bumper assembly illustrated in FIG. 4 installed on a loading dock.

In the illustrated embodiment shown in FIGS. 8 and 9, the hard stop 286 is formed of steel rectangular tube measuring 6×2×¼ inches. The tube 286 is welded on each end to the top and bottom L-brackets 276 and 278, and a notch 288 is formed in each bracket to provide a vent for the interior of the tube 286. The lateral side 290 of the hard stop 286 may be positioned approximately flush with the wall of the dock leveler pit 14 (see FIG. 1).

Figure 10:
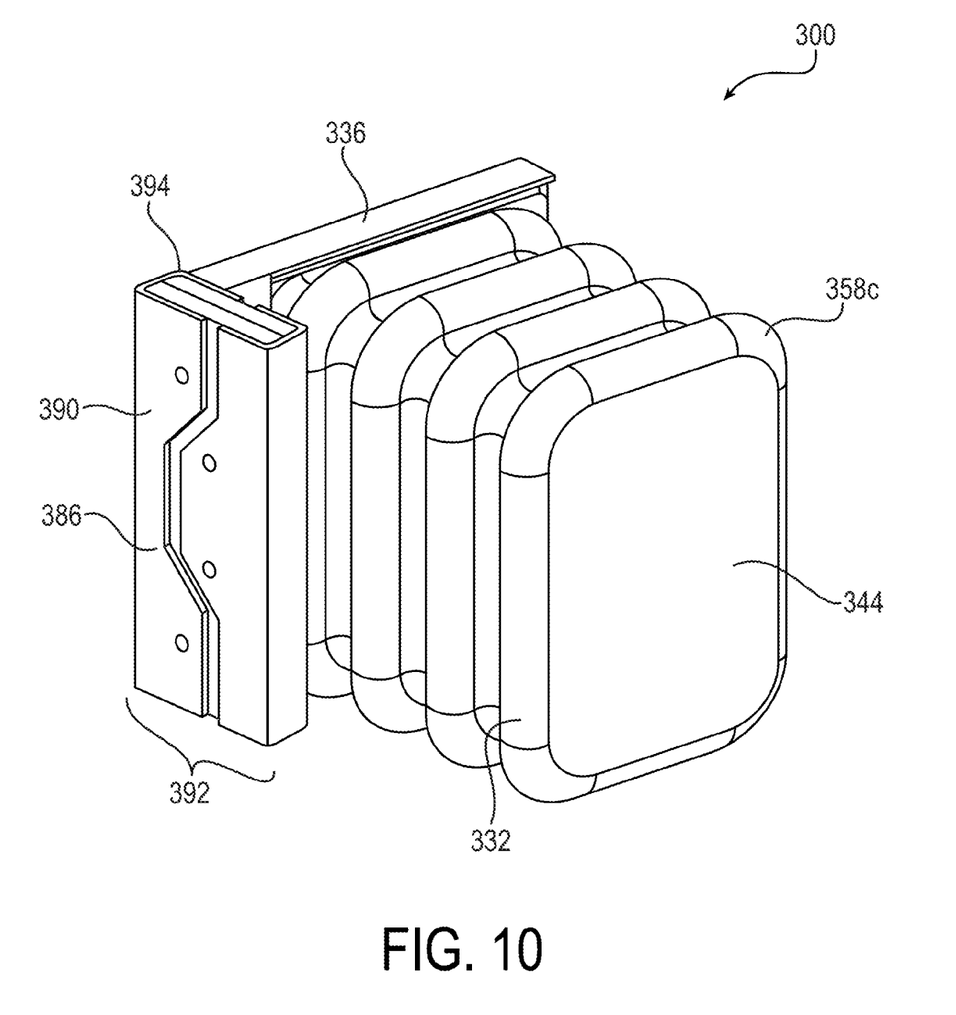
FIG. 10 depicts a front perspective view of a loading dock bumper assembly according to another embodiment of the invention.
Figure 11:
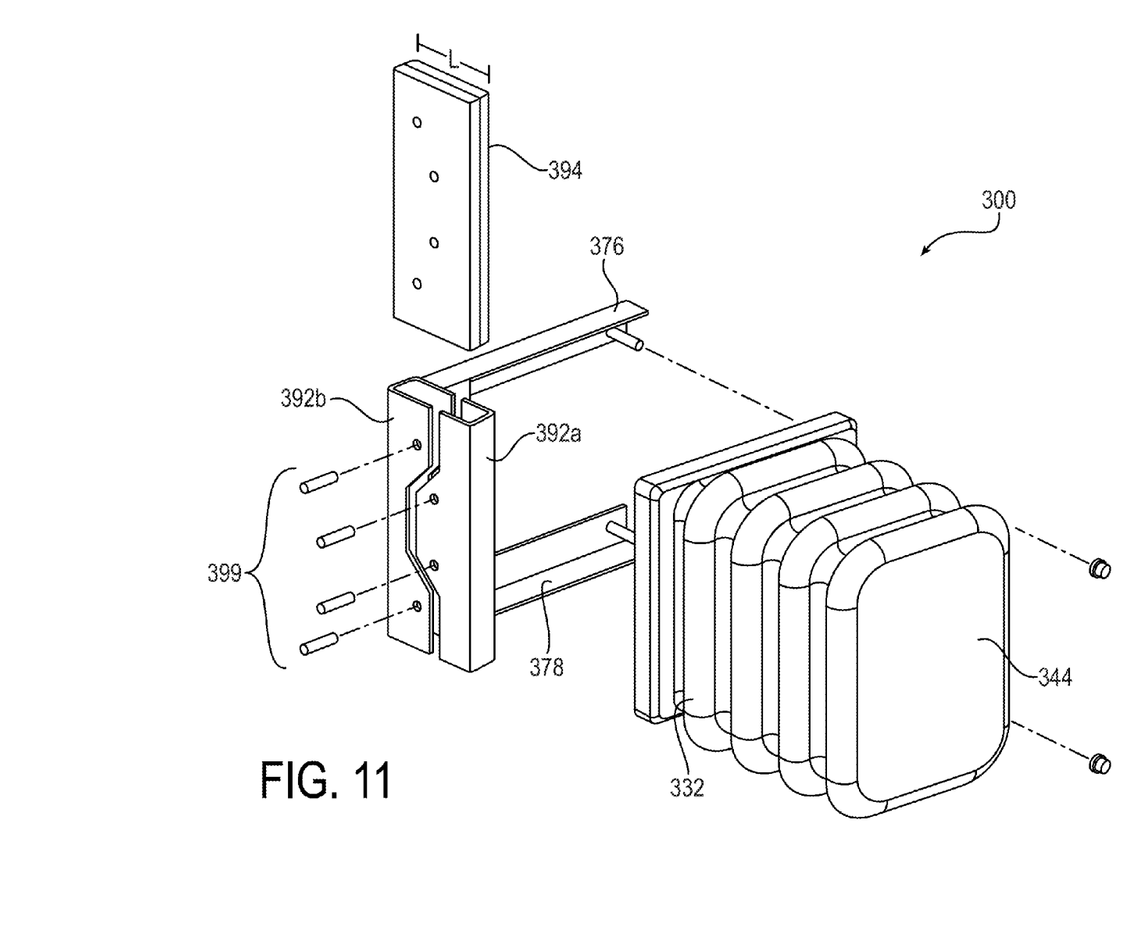
FIG. 11 depicts an exploded perspective view of the loading dock bumper assembly shown in FIG. 10.
Figure 12:
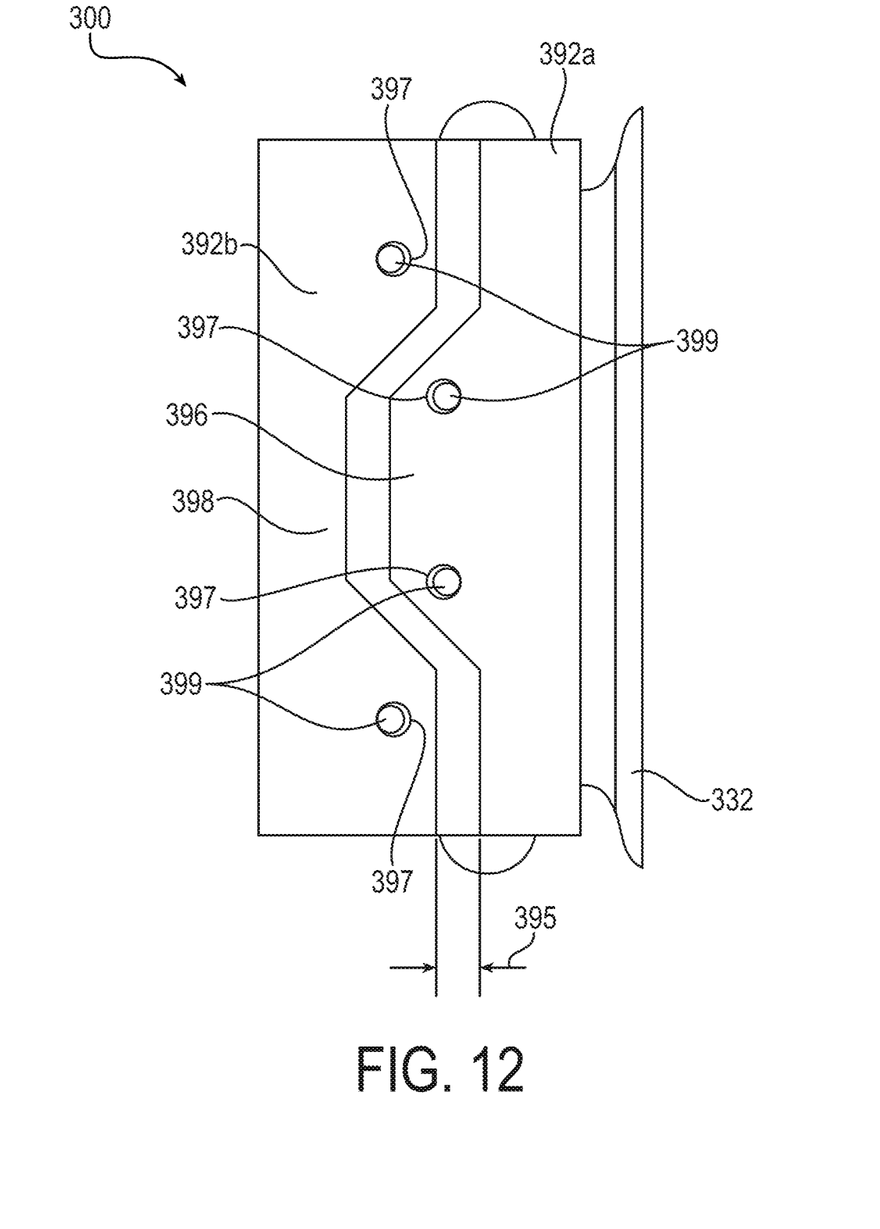
FIG. 12 depicts a side view of the loading dock bumper assembly shown in FIG. 10.

Turning now to FIGS. 10-12, a loading dock bumper assembly 300 is shown according to another embodiment of the invention. In this embodiment, the bumper portion 332 of the assembly 300 is as substantially described with respect to the embodiment presented in FIGS. 4-9, except that the impact-absorbing surface 344 is reinforced to provide more robust performance. In one embodiment, the contact surface 344 is formed of the same material as the remainder of the bumper 332, but is formed thicker. In one example, the entire contact surface 344 is uniformly thick but greater than the remainder of the bumper 332. In another example, the contact surface 344 has a variable thickness and may be thicker at the juncture of the major diaphragm 358c. The material thickness may be 25% greater, for example. In another embodiment, the impact-absorbing surface 344 may include a plate (not shown) formed of metal or other resilient material.

The loading dock bumper assembly 300 includes a hard stop 386 that provides a stiffer secondary cushion rather than an abrupt stoppage. The hard stop 386 may be fabricated of a two-piece outer shell 392 that captures a resilient, deformable inner member 394. The inner member 394 may be formed of masticated rubber, for example. The longitudinal length L of the inner member 394 is sized to provide a longitudinal gap 395 between the first and second outer shell pieces 392a, 392b respectively. The inner member 394 may be sized such that the gap 395 does not close down completely during compression.

The two-piece outer shell 392 may be formed by slitting a length of steel rectangular tube measuring 6×2×¼ inches. The second shell 392b may be welded on each end to top and bottom L-brackets 376 and 378. The outer shell pieces 392a, 392b protect the softer inner member 394 from direct contact with the vehicle trailer, thereby reducing wear from abrasion. The outer shell pieces 392a, 392b and the inner member 394 may define holes 397 to allow fasteners 399 to be passed therethrough. In one embodiment, the holes 397 may be oversized relative to the shank of the fasteners 399, or may form slots, to permit free movement of the outer shell pieces 392a, 392b and the inner member 394 during compression.

Although the deformable inner member 394 provides excellent performance in the longitudinal direction, in some constructions the aspect ratio of the member may not provide sufficient flexural rigidity to prevent it from rolling under lateral loads. For example, the exemplary construction illustrated in FIGS. 10 and 11 depict the longitudinal length L being several times greater than the width. As a result, dynamic loads imparted to the hard stop 386, especially in the lateral or sideways direction, may bend or roll the inner member 394 sideways.

One possible solution to this problem is to decrease the aspect ratio of the inner member 394. However, design constraints may prevent an adequate solution. For example, the hard stop 386 is typically located on the inside of the bumper assembly to assure a vehicle trailer will contact it (see FIG. 9). As noted, the lateral side 390 of the hard stop 386 may be positioned approximately flush with the wall of the dock leveler pit 14 (see FIG. 1). Thus, increasing the width of the hard stop 386 to decrease the aspect ratio may not be possible without interfering with the lip 24 of the deck 22. Similarly, decreasing the longitudinal length of the hard stop 386 may not be possible without jeopardizing operation of the bumper 332.

Accordingly, one or more of the outer shell pieces 392a, 392b may be adapted to provide flexural rigidity to the hard stop 386. In one embodiment of the invention, the slitting operation on the rectangular tube may be carried out to provide an irregular edge, rather than a straight (e.g., vertical) edge on the outer shell piece. The end result is at least one longitudinal extension 396 on either outer shell piece. In the illustrated example, the extension 396 is formed on the first outer shell 392a. The extension 396, which may alternately take the form of a saw tooth pattern, a tongue, a tang, etc., prevents the pliable inner member 394 from bending or rolling about a straight vertical axis.

In a related manner, a complimentary indent 398 may be formed in the opposing outer shell piece to provide additional flexural rigidity to the inner member 394. The indent 398 is preferably aligned with the extension 396 to create a segmented gap 395. As can be best appreciated from FIG. 12, the combination of extension 396 on the first outer shell 392a and indent 398 on the second outer shell 392b break up the vertical axis about which the inner member 394 has a propensity to roll or bend.

Because the fasteners 399 do not contact the inner member 394 due to the aforementioned oversized holes 397, a slip joint is created which further prevents rolling or bending of the inner member.

One of the improvements of the present disclosure is that in one embodiment the bumper reduces the load on the dock wall because of the increased contact surface area with the dock wall. The dock bumper of the current disclosure contacts the dock wall along substantially the entire mounting portion, in contrast to the rubber strips which do not completely contact the dock wall and may contact in an uneven manner. The increased contact surface area reduces the load on the dock wall because the force is distributed over a greater area.

In addition to increasing the contact surface area, the disclosed dock bumper absorbs and distributes shock loads in a manner far superior to conventional rubber strip dock bumpers. The prior art rubber strip bumpers exhibit compression force deflection (CFD) properties that follow a linear relationship. That is, the further the rubber strip dock seal is compressed, the harder it pushes against the dock wall. Because the rubber strip bumpers do not have a large degree of compressibility, a large force or hit will rapidly compress the bumper to its maximum and transfer the remaining load directly to the dock wall. In contrast, the CFD properties of the disclosed dock bumper are quite different, primarily due to its geometric shape and fluid-filled internal cavity. In one aspect, due to its fluid-filled internal cavity and soft, pliable skin, the longitudinal force exerted by the truck compresses the fluid and the bumper expands somewhat akin to a balloon under compression. In this manner, the truck forces are reacted out in other directions, including the lateral directions. As a result, a larger portion of the overall force is absorbed by the bumper, and therefore the load on the building is decreased. In embodiments wherein the sealing device includes a foam support, the support may be configured to tailor the compression force deflection properties in the longitudinal, lateral, and vertical directions so as to further decrease the load on the building.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements. Also, while a number of particular embodiments have been described, it will be understood that features and aspects that have been described with reference to each particular embodiment can be used with each remaining particularly described embodiment.

What is claimed is:

1. A loading dock bumper assembly for securement to a loading dock wall, comprising:
    a bumper comprising a mounting portion, an impact-absorbing portion opposing the mounting portion, and a deformable spanning portion joining the mounting portion and the impact-absorbing portion, the mounting portion adapted for coplanar alignment with the loading dock wall, the impact-absorbing portion adapted for direct contact with a rear frame of a vehicle, the bumper defining an internal cavity filled with a fluid;
    a mounting provision coupled to the bumper, the mounting provision adapted for installation to the loading dock wall; and
    a hard stop comprising a two-piece outer shell to capture and retain a resilient, deformable inner member, the hard stop disposed adjacent to said mounting provision, wherein the hard stop prevents further deformation of the bumper.

2. The loading dock bumper assembly according to claim 1, wherein a longitudinal length L of the inner member is sized to provide a longitudinal gap between the outer shell pieces.

3. The loading dock bumper assembly according to claim 2, wherein at least one of the outer shell pieces comprises a longitudinal extension to provide flexural rigidity to the inner member.

4. The loading dock bumper assembly according to claim 3, wherein the other of the outer shell pieces comprises an indent complementary to the extension.

5. The loading dock bumper assembly according to claim 1, wherein the outer shell pieces and the inner member define oversized holes to allow fasteners to be passed therethrough, the oversized holes sized to permit free movement of the outer shell pieces and the inner member during compression of the inner member.

6. The loading dock bumper assembly according to claim 1, wherein a characteristic spring rate of the hard stop is approximately two to five times greater than a characteristic spring rate of the dock bumper.

7. The loading dock bumper assembly according to claim 1, wherein a characteristic spring rate of the hard stop is more than ten times greater than a characteristic spring rate of the dock bumper.

8. The loading dock bumper assembly according to claim 1, wherein the hard stop is formed of a metal.

9. The loading dock bumper assembly according to claim 1, wherein the mounting portion comprises at least one passage through which a fastener is passed, the fastener secured to the mounting provision.

10. The loading dock bumper assembly according to claim 1, wherein the impact-absorbing portion comprises a flat surface.

11. The loading dock bumper assembly according to claim 1, wherein the bumper is formed of a pliable polymer.

12. The loading dock bumper assembly according to claim 1, wherein the internal cavity further comprises a strengthening member to provide directional deformation.

13. The loading dock bumper assembly according to claim 1, wherein said mounting provision comprises a pair of L brackets.

14. The loading dock bumper assembly according to claim 13, wherein a piece of said two-piece outer shell is mechanically coupled to an end of each L bracket of said pair of L brackets.

15. The loading dock bumper assembly according to claim 13, wherein a piece of said two-piece outer shell is mechanically coupled to an end of each L bracket of said pair of L brackets by a weld.

16. A loading dock bumper assembly for securement to a loading dock wall, comprising:
    a bumper comprising a mounting portion, an impact-absorbing portion opposing the mounting portion, and a deformable spanning portion joining the mounting portion and the impact-absorbing portion, the mounting portion adapted for coplanar alignment with the loading dock wall, the impact-absorbing portion adapted for direct contact with a rear frame of a vehicle, the bumper defining an internal cavity filled with a fluid;

a mounting provision coupled to the bumper, the mounting provision adapted for installation to the loading dock wall; and a hard stop adapted to retard further deformation of the spanning portion; the hard stop comprising a two-piece outer shell to capture and retain a resilient, deformable inner member;

wherein a longitudinal length L of the inner member is sized to provide a longitudinal gap between the outer shell pieces;

wherein at least one of the outer shell pieces comprises a longitudinal extension to provide flexural rigidity to the inner member; and wherein the other of the outer shell pieces comprises an indent complementary to the extension.

* * * * *